United States Patent [19]
Villette

[11] 3,841,487
[45] Oct. 15, 1974

[54] FILTER DEVICE
[76] Inventor: Guy Villette, 20, Rue des Marronniers 38, Grenoble, France
[22] Filed: May 15, 1972
[21] Appl. No.: 253,142

[30] Foreign Application Priority Data
May 14, 1971 France .............................. 71.18525

[52] U.S. Cl. ................. 210/123, 210/169, 210/239
[51] Int. Cl. ........................................... B01d 23/02
[58] Field of Search .......... 210/124, 128, 129, 169, 210/239, 123

[56] References Cited
UNITED STATES PATENTS
3,168,470  2/1965  Rhoda ................................ 210/239
3,567,020  3/1971  Whitaker et al. ................ 210/169 X
3,618,774  11/1971 Delphia .............................. 210/128

Primary Examiner—Samih N. Zaharna
Assistant Examiner—Robert H. Spitzer
Attorney, Agent, or Firm—Robert E. Burns; Emmanuel J. Lobato; Bruce L. Adams

[57] ABSTRACT

Device for purifying the surface and subsurface water in swimming pools, providing an easy means of examining the filter basket for the water taken in by suction from the bottom plug of the pool, at the same time enabling the filter circuit for the surface water to be isolated if necessary. The device, called a skimmer, comprises a first filter basket associated with a float and effecting the filtration of the surface water, a second filter basket situated underneath the first filter basket and filtering the water already filtered by the first filter basket and also the water taken in by suction by the bottom plug.

1 Claim, 1 Drawing Figure

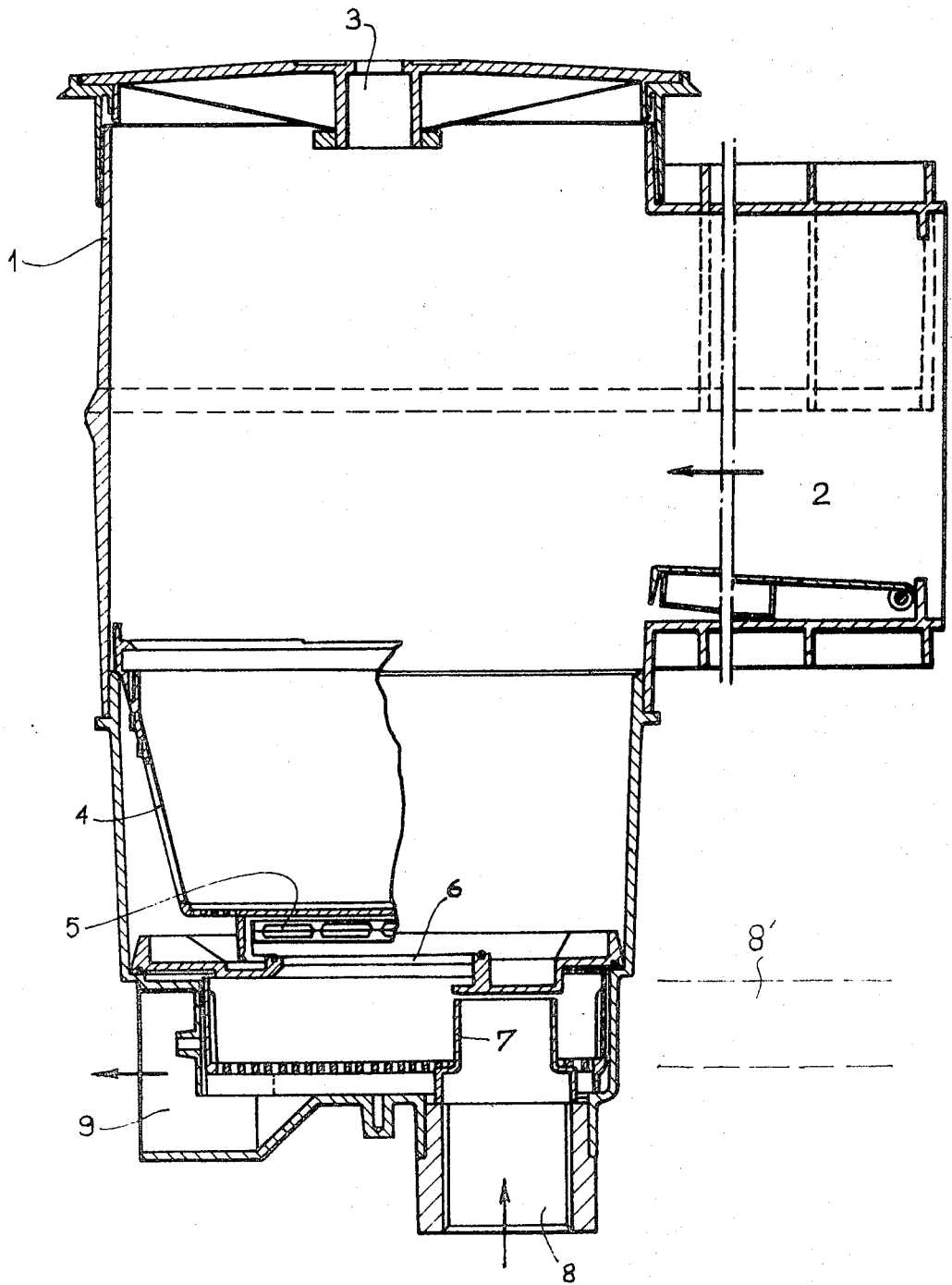

3,841,487

FILTER DEVICE

BACKGROUND OF THE INVENTION

This invention relates to the purification of water and more particularly to a device for purifying the water of swimming pools.

Such devices, known in Anglo-Saxon countries as skimmers, which term will be adopted hereinafter, are already known. They drain the surface water of swimming pools, collect and retrain floating extraneous matter, such as leaves and paper etc., by means of a filter, and enable the water thus purified to be returned to the swimming pool after pumping and filtration. A second circuit connected to the bottom plug of the swimming pool also enables the water to be freed of the foreign bodies resting on the bottom, by means of a preliminary filter mounted upstream from the circulation pump.

The skimmers proposed hitherto have not proved entirely satisfactory.

The fact is that they do not generally filter the water taken in by suction through the bottom plug, and when they filter this water, returning it to a position above the basket by which the surface water is filtered, the skimmer, in addition to its complexity, does not enable the circuit of the surface water to be isolated when the level of the water in the swimming pool becomes lower than normal.

The present invention seeks to decrease these drawbacks and, by a special arrangement of the skimmer, enables the surface water and that of the bottom plug to be filtered, at the same time ensuring the isolation of the surface circuit when the water in the swimming pool descends below its normal level.

BRIEF SUMMARY OF THE INVENTION

The skimmer to which the invention relates is characterized by the fact that the basket of the preliminary filter of the circulation pump is situated at the bottom of the skimmer in order to combine it with the main filter basket for the surface water, regularly inspected by users.

Again in accordance with the invention, a float associated with the main basket will close an orifice situated below the main basket when the level of the water descends in the skimmer as a result of lack of water in the swimming pool.

Finally, the skimmer to which the invention relates is further characterized by the fact that water emanating from the bottom plug is caused to pass through the lower basket.

Further characteristics and advantages of the present invention will emerge in the course of the following detailed description, by reference to the accompanying drawing, provided by way of an example, without any limitative effect, and enabling the method of carrying out the said invention to be clearly understood.

BRIEF DESCRIPTION OF THE DRAWING

The single drawing is a sectional diagram illustrating the layout and operation of one embodiment of a skimmer according to the invention.

DESCRIPTION OF PREFERRED EMBODIMENT

The skimmer has a casing 1 made of a molded synthetic material and of substantially cylindrical shape. An orifice 2 is provided at one side, giving access to the surface water of, for example, a swimming pool. At the top is a removable cover 3. Below the side orifice 2 is a main filter basket 4 for filtering the surface water entering through the orifice 2. The basket 4 has the shape of a truncated cone, the filter element consisting of its lateral peripheral wall. The base of the basket 4 is solid. At the base of the basket is a float chamber in which a float 5 is provided. The float 5 seats when the level of the water descends, on an orifice 6, thus sealing the orifice. The circuit of the surface water is then no longer in serivce. Below the main basket 4 is a second basket 7 of which the filter element is formed by the base. Through the basket 7 pass on the one hand the surface water already filtered by the main basket 4 and on the other hand the water taken in by suction through the bottom plug or sluice of the swimming pool, and this water passes to the skimmer via a lower inlet 8. The surface water and the water emanating from the bottom plug then leave the skimmer by a lower orifice 9 and are returned, purified, through one single conduit, and via a circulation pump (not shown) to the swimming pool.

As an alternative, the lower inlet 8 for the water taken in by suction from the bottom plug can be situated at 8′, slightly increasing the total height of the casing of the skimmer.

The skimmer to which the invention relates offers the advantage of combining, in one single apparatus, the functions of all the skimmer systems already known, i,e.

- the preliminary filtering of the water emanating from the surface and that emanating from the bottom plug;
- the possibility of using a float valve which isolates the water taken in at the surface when the level of the water in the swimming pool descends, the only circuit then maintained being that between the pump and the bottom plug;
- the equilibration of the ratio between the bottom plug delivery and the surface delivery.

I claim:

1. In combination, a swimming pool and a swimming pool skimmer comprising, a body having a side opening for freely allowing surface water of said pool to flow into said body, a first strainer basket below the level of said opening disposed for receiving the surface water flowing into said body through said side opening and straining it, a second strainer basket below the level of said first strainer for receiving strained surface water from the first strainer, a float check valve disposed for stopping flow of water from the first strainer basket to the second strainer basket when the level of the water within the body reaches a selected level corresponding to a level in the vicinity of a level at which said float check valve is disposed, means defining an inlet in the bottom of the pool for flow into the second strainer of a supply of water other than said strained surface water for straining thereof, means for discharging from said second strainer through a common discharge outlet all the strained surface and strained other water for return to the swimming pool, and said float check vale being disposed below the first strainer and above the second strainer, said second strainer having an inlet on an upper end thereof over which said float check valve seats, and said float check valve seating entirely covering the last mentioned inlet when said level of the water obtains thereby isolating the first strainer from the second strainer and said inlet and discharge outlet while continuing to strain said other water in said second strainer.

* * * * *